UNITED STATES PATENT OFFICE.

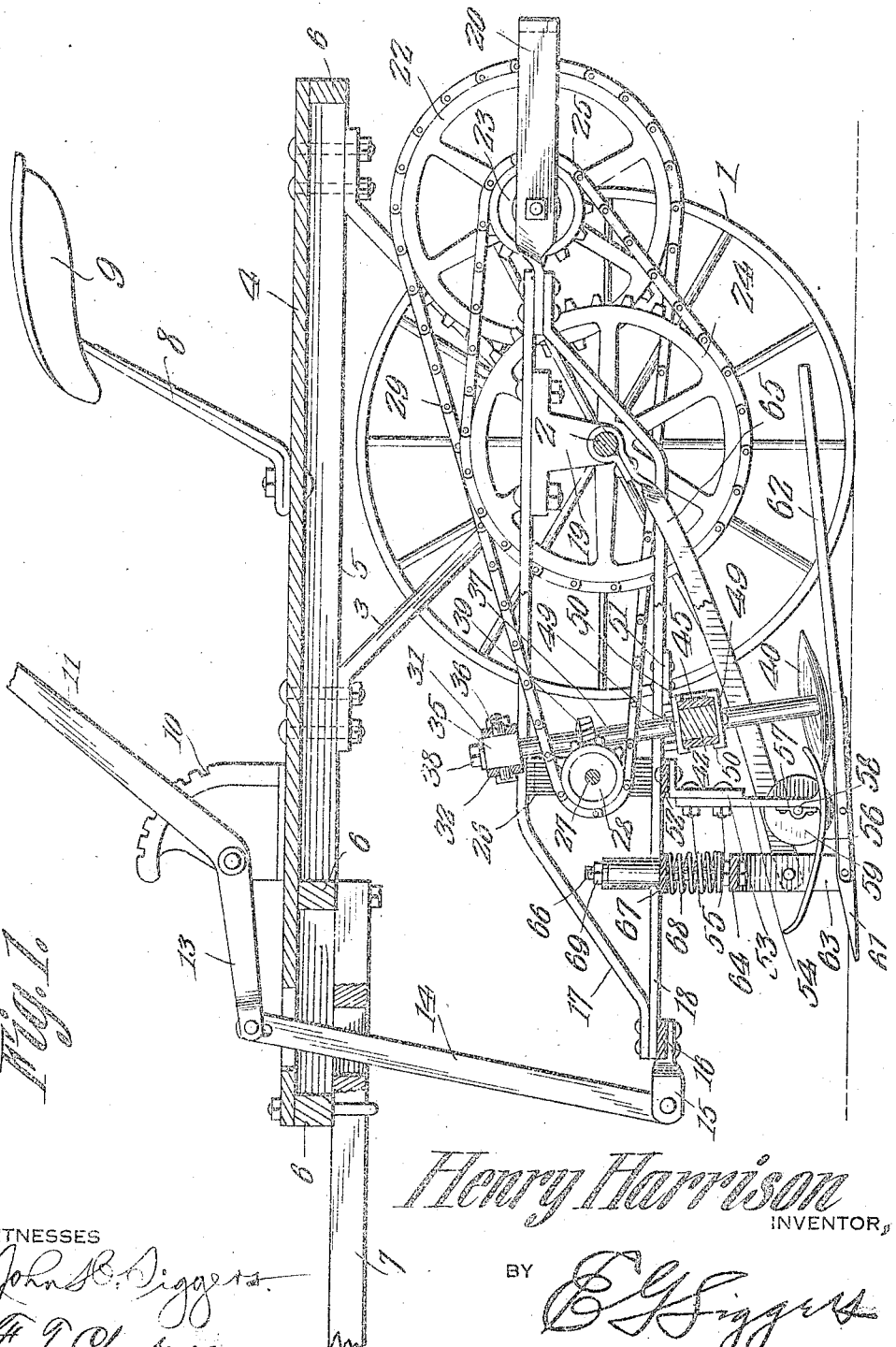

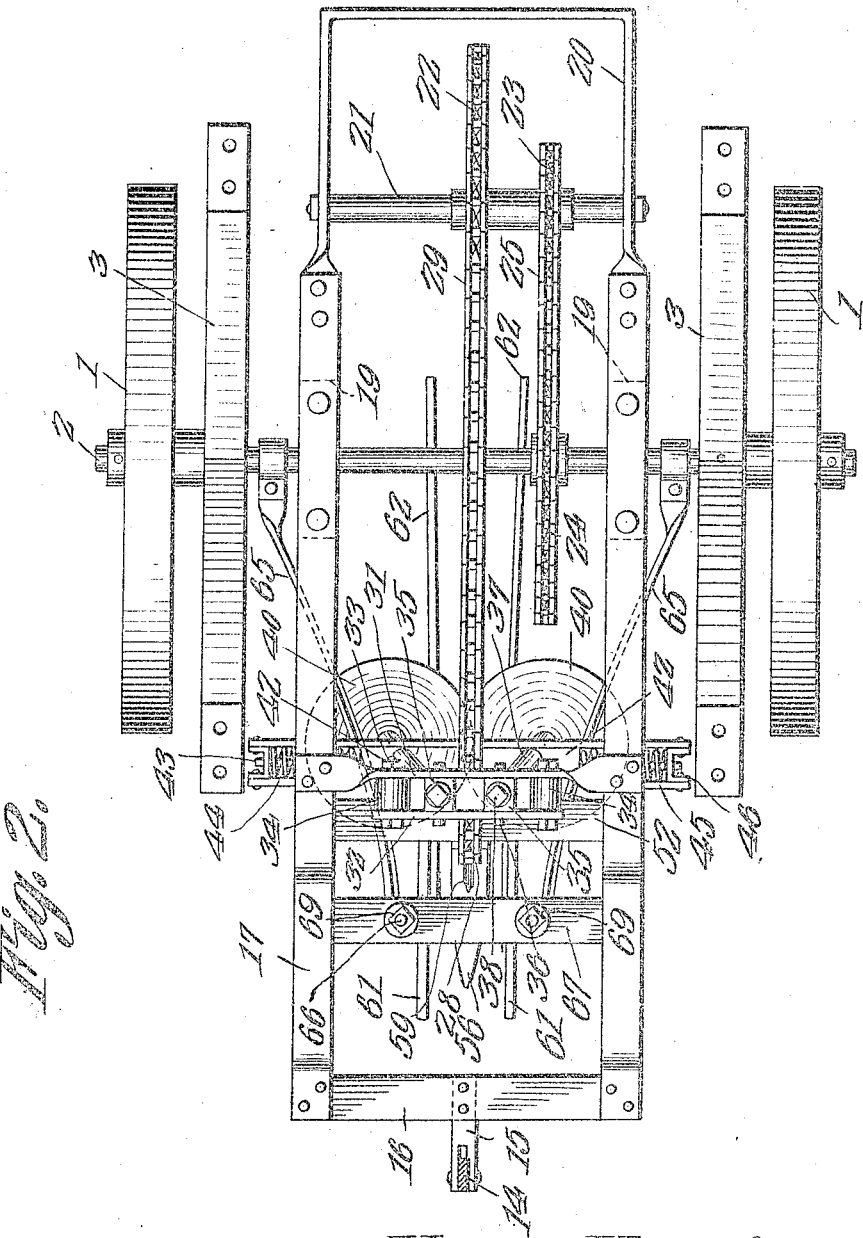

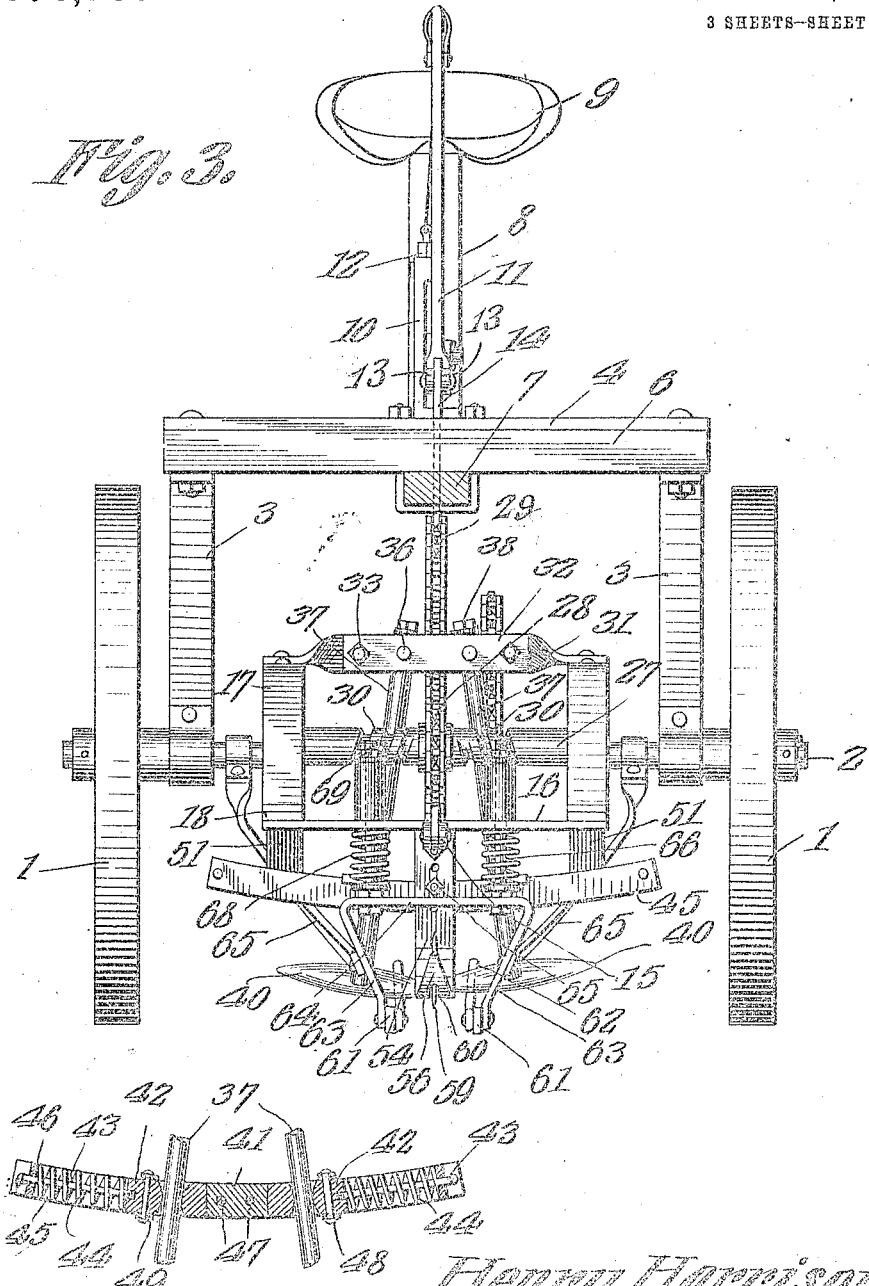

HENRY HARRISON, OF RIFLE, COLORADO, ASSIGNOR OF ONE-FOURTH TO THAD S. HARP AND ONE-HALF TO IRVING L. AVERY, BOTH OF RIFLE, COLORADO.

BEET-TOPPER.

1,076,363.  Specification of Letters Patent.  Patented Oct. 21, 1913.

Application filed May 29, 1912. Serial No. 700,509.

*To all whom it may concern:*

Be it known that I, HENRY HARRISON, a citizen of the United States, residing at Rifle, in the county of Garfield and State of Colorado, have invented a new and useful Beet-Topper, of which the following is a specification.

This invention has reference to improvements in beet toppers and its object is to provide a machine for the purpose whereby the beets are most effectively topped prior to being removed from the ground.

In accordance with the present invention there is provided a suitable vehicle having rotatable cutters arranged in coactive relation to engage the beet top close to the body of the beet. Provision is made for the yielding of the cutters to any hard substance liable to be injurious thereto without throwing the cutters permanently out of active relation one to the other. Furthermore provision is made for the splitting of the beet tops prior to being acted upon by the cutters, so that the tops will fall to opposite sides of the beet and the beet may be lifted from the ground without liability of carrying the tops with it.

The invention will be best understood from a consideration of the following detailed description taken in connection with the accompanying drawings forming a part of this specification, with the further understanding that while the drawings illustrate one practical form of the invention it is susceptible of other practical embodiments, wherefore the invention is not confined to any strict conformity with the showing of the drawings but may be changed and modified so long as such changes do not mark any material departure from the salient features of the invention.

In the drawings:—Figure 1 is a central longitudinal vertical section through the machine. Fig. 2 is a plan view thereof with the platform or flooring omitted and some parts extending through the flooring shown in section. Fig. 3 is a front elevation of the machine with the draft pole in cross section. Fig. 4 is a detail sectional view of yielding devices used in connection with the cutters.

Referring to the drawings there is shown a vehicle provided with wheels 1, an axle 2, upstanding supports 3 mounted on the axle and a platform 4 carried upon sills 5 in turn supported by the uprights 3. The sills 5 are connected by cross members 6 to certain of which a pole 7 may be secured. The platform is designed to carry a seat post 8, on which is mounted a seat 9 and may also carry a rack segment 10 provided with a manipulating lever 11 having the usual thumb latch 12 for holding the lever in adjusted positions with relation to the rack 10. This lever is provided with a short arm 13 connected by a link 14 to an eye 15 fast to a cross member 16 intermediately of the length thereof, this cross member 16 being made fast at the ends to connected side members 17, 18 of a frame. The pairs of members 17 and 18 are disposed on opposite sides of the center line of the machine and together form skeleton beams of which the members 17 have blocks 19 secured thereto and supported on the axle 2. Extending from the connected rear ends of the members 17, 18 is a yoke 20, in the legs of which are journaled the ends of a shaft 21 carrying a large sprocket gear 22 and a sprocket pinion 23.

Mounted on the axle 2 is a sprocket gear wheel 24 connected by a chain 25 with the pinion 23, so that when the wheels turn as the machine is drawn forward by draft animals or otherwise, the shaft 2, which is made fast to the wheels, participates in the rotative movement of the wheels and motion is imparted at a higher rate of speed to the shaft 21 by the sprocket gear wheel 24, chain 25 and pinion 23.

Each skeleton side beam made up of the members 17 and 18 has between the members 17, 18 near the front ends thereof a spacer 26, there being two such spacers, and journaled in these spacers is a shaft 27 to which is secured a sprocket pinion 28 engaged by a sprocket chain 29 coming from the sprocket wheel 22, so that the rotative movement of the shaft 21 is imparted to the shaft 27. The parts are so proportioned that a comparatively slow rotative movement of the axle 2 produces a moderately rapid rotation of the shaft 21 and a high speed rotation of the shaft 27. The sprocket pinion 28 is located about midway of the length of the shaft 27, and on opposite sides of the sprocket wheel the shaft is formed with worm sections 30.

Extending between the side members 17 at a point a little to the rear of the shaft 27 is a bar 31 to which is attached another shorter bar 32 by bolts 33 on which are mounted spacer blocks 34, so that the bars 31 and 32 are separated by a space equal to the length of the spacer blocks. Between the bars 31 and 32 on opposite sides of the center line of the machine are mounted other blocks 35 each having oppositely directed studs 36 serving as trunnions for the pivotal support of the block 35. Extending through each block 35 is one end of a shaft 37, such end being the upper end of the shaft when the machine is in operation, and this shaft is held against longitudinal movement in the respective block 35 by a nut 38 applied to the corresponding end of the shaft. At an appropriate point each shaft carries a worm pinion 39 in position to engage a respective one of the worms 30. Each shaft 37 is of a length to reach nearly to the ground when the machine is in operative position and at its lower end carries a cutting disk 40 slightly inclined to the horizontal, and the two shafts 37 are so disposed that the cutting disks slightly overlap. For purposes of strength the disks may be slightly dished. Between the worm pinions 39 and the disks 40 each shaft 37 extends between an intermediate spacing member 41 and respective blocks 42, the ends of the member 41 being rounded and those ends of the blocks 42 engaging the shafts 37 being also rounded. Each block 42 is carried by one end of a pin or rod 43 surrounded by a helical spring 44. The block 41 is mounted between two plates 45 curved in approximate conformity to an arc struck from the bar 31 or 32. The plates 45 at their ends are spaced by other plates 46 perforated to serve as guides for the rods 43 and the plates are further united by bolts or pins 47 extending through the member 41, while the blocks 42 are traversed by bolts or pins 48 also traversing straps 49 having angle ends 50 embracing the plates 45 and so disposed as to move lengthwise of the plates 45 along the respective upper and lower edges thereof. The structure made up of the plate 45 and the parts carried thereby may be in turn supported by brackets 51 made fast to the members 18 of the skeleton side beams.

In front of the shafts 37 the members 18 are connected by a cross member 52 about midway of which is attached a bracket 53, and this bracket carries a bar 54 having a suitable number of bolt holes for the passage of bolts 55 traversing both the bar 54 and the bracket 53, so that the bar 54 may be adjusted up and down as desired. The lower end of the bar 54 carries a curved shoe 56, and furthermore is provided with bearings 57 for a spindle 58 in turn carrying a disk cutter 59 extending through a slot 60 in the shoe so that a portion of the cutting edge of the cutter 59 is below the lower surface of the shoe 56.

Disposed on opposite sides of the cutter 59 are points 61 having lifting rods 62 continued rearwardly therefrom. These points are supported by the ends of legs 63 forming part of a yoke 64 and the legs 63 are connected by brace bars 65 to the axle 2. The connecting member of the yoke 64 carries rods 66 extending through a cross member 67 between the members 18 and between the yoke 64 and the bar 67 the rods 66 are surrounded by helical springs 68. Above the bar 67 the rods 66 have nuts 69 applied thereto for purposes of adjustment and for securing the rods against falling.

By means of the lever 11 the entire frame made up of the side members 17, 18 and the connecting cross members thereof may have its front portion raised and lowered about the axle 2 as a pivot, and this raising and lowering is participated in by the cutters 40, the cutter 59 and the beet lifting points 61, together with the beet elevating finger 62 so that the operator may adjust the machine to the conditions present. If the machine be moved through a field of beets and properly guided, the points 61 will pass on opposite sides of the beets of a row, while the shoe 56 will engage the beet tops and flatten them, the cutter 59 then in turn engaging the beet tops and severing them intermediately in the direction of the length of the beet root. Immediately afterward the flattened and divided beet tops are engaged by the cutters 40 which attack the beet tops from opposite sides and cut them from the body of the beet and then the beet tops being already intermediately severed fall to opposite sides of the beet body and the latter may be elevated by means of the fingers 62, or by any other appropriate mechanism, from the ground. Should the cutters 40 engage a stone or other hard substance there immediately arises a tendency to spread the cutters, swinging the shafts 37 on the pivots 36 so that the cutters will separate one from another, this being permitted by the yielding of the springs 44, but as soon as the obstruction is passed the reaction of the springs 44 returns the cutters to their ordinary operative position.

The cutter carrying frame extends both to the front and to the rear of the axle upon which the frame is pivotally mounted and part of the driving mechanism is mounted in the frame to the rear of the axle, while the cutters and other parts of the mechanism are mounted on the frame in front of the axle. The carrying frame for the active mechanism is therefore more or less counterbalanced by the rearward extension thereof, so that little effort is necessary to adjust the frame by the operation of the lever 11, but the preponderance of weight at the cutter or front end of the frame is sufficient to maintain the parts in operative relation to the beets.

What is claimed is

1. A beet topper provided with rotatable cutters, carrying shafts therefor pivotally mounted at the ends remote from the cutters to swing toward and from each other at the cutter ends, and actuating means for the shafts between the pivoted ends thereof and the cutters.

2. A beet topper provided with rotatable cutters, carrying shafts therefor pivotally mounted at the ends remote from the cutters to swing toward and from each other at the cutter ends, actuating means for the shafts between the pivoted ends thereof and the cutters, spacer means for the shafts for determining their approach, and elastic means engaging the shafts for permitting them to move apart yieldingly and constraining the shafts toward the approaching position.

3. A beet topper provided with opposed rotatable cutters, a shaft for each cutter provided with a pivotal mounting at the end remote from the cutter, elastic means engaging the shafts between the pivot ends and the cutters and tending normally to cause the cutters to approach, and drive means engaging the shafts between the elastic means and the pivoted ends of the shafts.

4. A beet topper provided with opposed rotatable cutters, a shaft for each cutter provided with a pivotal mounting at the end remote from the cutter, elastic means engaging the shafts between the pivot ends and the cutters and tending normally to cause the cutters to approach, and drive means engaging the shafts between the elastic means and the pivoted ends of the shafts, said drive means comprising a worm member on each shaft and a worm shaft engaging the worm members of both shafts.

5. In a beet topper, rotatable cutters, a shaft for each cutter at one end of which the cutter is mounted, a pivot support for the other end of each shaft, a spacing member intermediate of the shafts and determining the approach of the shafts one toward the other, elastic members one for each shaft in the path of the movement of the shafts one away from the other, and driving means for the shafts engaging the same between the elastic members and the pivot supports for the shafts.

In testimony, that I claim the foregoing as my own, I have hereto affixed my signature in the presence of two witnesses.

HENRY HARRISON.

Witnesses:
R. E. HUTCHINGS,
H. S. BOUGHTON.